(12) United States Patent
Siegmund

(10) Patent No.: US 11,446,121 B2
(45) Date of Patent: Sep. 20, 2022

(54) DENTAL REPLACEMENT MOUNTING SYSTEM

(71) Applicant: Permatooth Inc., East St. Paul (CA)

(72) Inventor: Erik Siegmund, Winnipeg (CA)

(73) Assignee: Preferred Dental Implant Corp., Winnipeg (CA)

(\*) Notice: Subject to any disclaimer, the term of this patent is extended or adjusted under 35 U.S.C. 154(b) by 1281 days.

(21) Appl. No.: 14/353,794

(22) PCT Filed: Oct. 25, 2012

(86) PCT No.: PCT/CA2012/050760
§ 371 (c)(1),
(2) Date: Apr. 24, 2014

(87) PCT Pub. No.: WO2013/059939
PCT Pub. Date: May 2, 2013

(65) Prior Publication Data
US 2014/0302457 A1    Oct. 9, 2014

Related U.S. Application Data

(60) Provisional application No. 61/551,635, filed on Oct. 26, 2011.

(51) Int. Cl.
*A61C 8/00* (2006.01)
*A61C 13/20* (2006.01)

(52) U.S. Cl.
CPC ............ *A61C 8/0053* (2013.01); *A61C 13/20* (2013.01); *A61C 8/0001* (2013.01); *A61C 8/0068* (2013.01)

(58) Field of Classification Search
CPC ..... A61C 8/0053; A61C 13/20; A61C 8/0001; A61C 8/0068
USPC ......................................................... 433/181
See application file for complete search history.

(56) References Cited

U.S. PATENT DOCUMENTS 3,732,621 A \* 5/1973 Bostrom .............. A61C 8/0022
433/174
4,793,808 A    12/1988 Kirsch
4,907,969 A     3/1990 Ward
(Continued)

FOREIGN PATENT DOCUMENTS

WO          00/04842       2/2000

OTHER PUBLICATIONS

U.S. Appl. No. 10/627,265, filed Jan. 27, 2005, Gittleman.
(Continued)

*Primary Examiner* — Heidi M Eide
*Assistant Examiner* — Drew S Folgmann
(74) *Attorney, Agent, or Firm* — Kyle R Satterthwaite; Ryan W Dupuis; Ade & Company Inc.

(57) ABSTRACT

Dental implant systems, components and methods feature use of a mounting component onto which an abutment is to be cast or soldered. The mounting component is configured with an upper end that is contoured in a spherical or other suitable manner to present a surface over which the abutment can be slid into various positions on said surface at various angles relative to an axis of the implant body on which the mounting component is supported. Accordingly, the abutment can be set at a desired angle whether the this desired orientation matches or misaligns with the axis of the implant body.

20 Claims, 5 Drawing Sheets

(56) References Cited

U.S. PATENT DOCUMENTS

| | | | |
|---|---|---|---|
| 5,116,225 A * | 5/1992 | Riera | A61C 8/005 |
| | | | 433/173 |
| 5,145,372 A | 9/1992 | Daftary et al. | |
| 5,211,561 A * | 5/1993 | Graub | A61C 8/0086 |
| | | | 433/169 |
| 5,302,125 A | 4/1994 | Kownacki et al. | |
| 5,520,540 A | 5/1996 | Nardi et al. | |
| 5,571,015 A | 11/1996 | Seigmund | |
| 5,662,475 A | 9/1997 | Mena | |
| 6,299,447 B1 * | 10/2001 | Zuest | A61C 8/0048 |
| | | | 433/172 |
| 6,786,725 B2 | 9/2004 | Lustig et al. | |
| 2004/0241610 A1 * | 12/2004 | Hurson | A61C 8/0022 |
| | | | 433/173 |
| 2006/0099549 A1 * | 5/2006 | Engman | A61C 8/0001 |
| | | | 433/173 |
| 2007/0298374 A1 * | 12/2007 | Carlton | A61C 8/0089 |
| | | | 433/72 |
| 2010/0112520 A1 * | 5/2010 | Worthington | A61C 8/0001 |
| | | | 433/169 |

OTHER PUBLICATIONS

U.S. Appl. No. 11/739,343, filed Aug. 16, 2007, Giorno.
U.S. Appl. No. 11/986,752, filed Jul. 10, 2008, Kast et al.
U.S. Appl. No. 12/453,574, filed May 26, 2011, Hinrichsen.

* cited by examiner

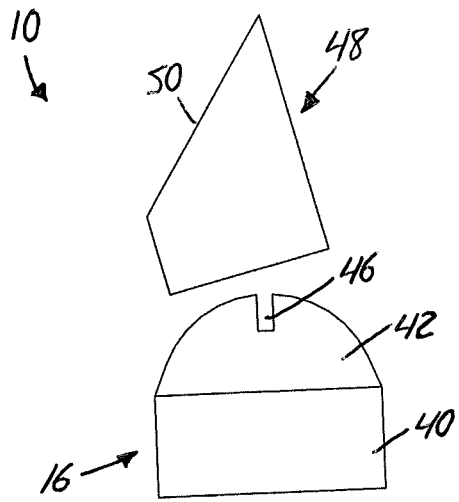
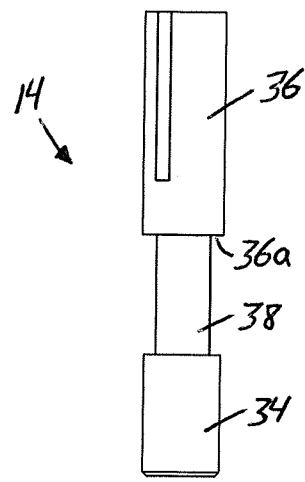
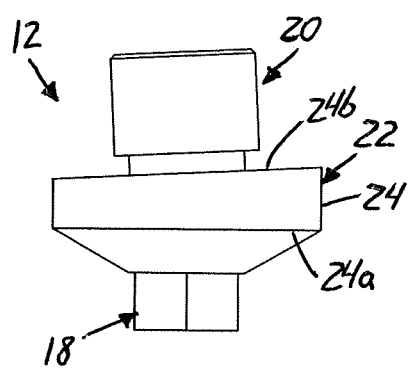
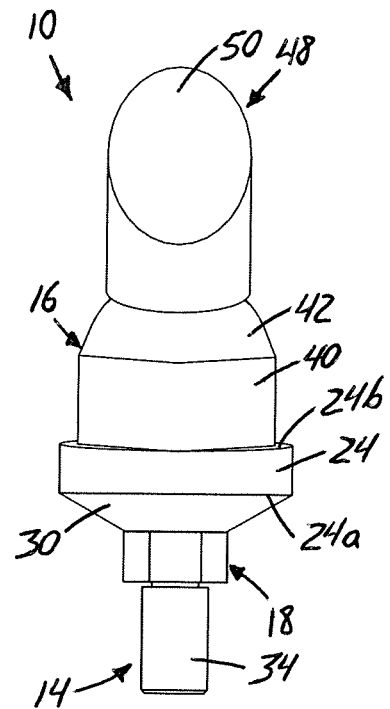
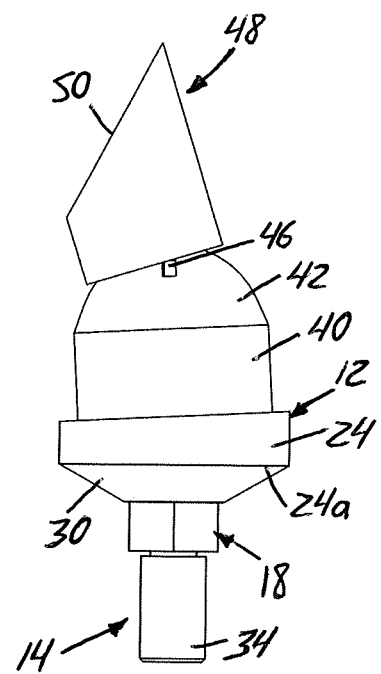
Fig. 1A    Fig. 1B    Fig. 1C

DENTAL REPLACEMENT MOUNTING SYSTEM

This application is a 371 national stage of PCT/CA2012/050760, filed Oct. 25, 2012, and claims benefit under 35 U.S.C. 119(e) of Provisional Application Ser. No. 61/551,635, filed Oct. 26, 2011.

FIELD OF THE INVENTION

The present invention relates to dental implants for tooth replacements such as crowns, bridges and dentures in the fields of dentistry, oral surgery and orthodontics and, more particularly, to a mounting system for selected directional support of a dental replacement and a mounting system for placement of dental replacement mounting heads on implants for which the mounting heads are not directly compatible.

BACKGROUND OF THE INVENTION

A variety of dental replacement mounting arrangements and methods are known. One commonly used arrangement includes a dental implant in the form of a pin, screw, plate or solid or perforated cone which functions as an artificial dental root, a transmucosal member made of tissue compatible material which extends across the gingival tissue and is either integral with or affixed to the implant to provide a mounting base for an abutment for a dental prosthetic structure. All parts of these arrangements are provided with and interconnected by way of central axis boreholes and cooperating fasteners engageable therewith. Arrangements of this type are disclosed in U.S. Pat. No. 3,435,526 by Brancato, U.S. Pat. No. 4,016,651 by Kawahara et al., U.S. Pat. No. 4,178,686 by Riess et al., and U.S. Pat. No. 4,713,006 by Hakametsuka et al.

Attachment bases or implants for dental replacements are inserted or screwed into the jaw bone. However, since jaw bones are often rather narrow and are inclined in vertical direction and the attachment base must, for technical reasons, be well centred in the jaw bone, the longitudinal direction of the attachment base may not be in alignment with the longitudinal direction of adjacent teeth or abutments, because of the constructional restraints of central axis boreholes. This is a problem, since the teeth of the prosthetic structure should ideally align with the attachment base for maximum strength of the whole arrangement. The result is either a weak and unsatisfactory connection between the implant and the jaw bone or a misaligned prosthetic structure. Thus, a dental replacement arrangement is desired which would provide for compensation of a misalignment between the longitudinal direction of the implant and the longitudinal direction of adjacent teeth or abutments thereby ensuring that the prosthetic structure is aligned with the attachment base.

Bostrom, in U.S. Pat. No. 3,732,621, describes an implantable fixture for a dental prosthetic structure which fixture includes a first part for embedding into the jaw bone and a second part which serves as an attachment' base for the prosthetic structure and passes through the weak tissue covering the bone tissue. The first and second parts are interconnected by way of a sealed ball and socket joint which can be locked in a desired angle or position. Thus, a misalignment of the implant with respect to the surrounding teeth can be compensated without misalignment of either the implant in the jaw bone or the prosthetic structure on the attachment base. However, the ball and socket joint may become unlocked when the prosthetic structure is subjected to biting stress or when the dental surgeon has to screw on the prosthetic structure. This can lead to misalignment of the attachment base. The misalignment can then only be corrected by removal of the prosthetic structure and resetting of the joint, which can be a serious problem if the prosthetic structure has already been permanently cemented onto the attachment base leaving the joint locking screw inaccessible.

Another attempt at solving the problem of angulation is angled abutments which are directly screwed into the implant and are commercially available, for example from CORE-VENT CORPORATION (Encino, Calif.). Although angled abutments can be used to compensate for angulation, they are unsuited for applications where lateral working space is restricted such as in single tooth replacement. The diameter of the circle, described by the abutment tip during screwing into the implant is frequently larger than the distance between adjacent teeth, making it impossible to use the angled abutment or forcing the dentist to use an abutment which does not fully compensate implant angulation. Thus, a tooth replacement mounting system is desired which fully compensates any implant angulation present and can be used in confined spaces.

Other patents concerning angulation issues include U.S. Pat. Nos. 4,907,969, 4,793,808, 5,302,125, 5,662,475 and 6,786,725.

U.S. Pat. No. 5,571,015, issued to one of the co-applicants of the present application, the entirety of which is incorporated herein by reference, addressed a number of these issues relating to proper alignment of the prosthetic structure, however during development of the system disclosed therein, a number of improvements to the configuration and use of the device have been developed by the Applicants.

SUMMARY OF THE INVENTION

According to one aspect of the invention there is provided an angularly adjustable dental implant abutment mounting system for supporting an abutment on a dental implant at any of a number of selectable orientations of varying degree of alignment between a longitudinal abutment axis and a longitudinal implant axis in order to situate the longitudinal abutment axis on a desired axis for suitable positioning of a dental prosthetic structure on the abutment, the system comprising:

a transmucosal collar comprising a lower portion configured to coaxially engage an upper end of the dental implant, a cylindrical upper portion having external threading thereon, and an axial bore passing fully through the transmucosal member from an upper end of the upper portion to a lower end of the lower portion;

a fixation screw comprising an externally threaded shaft for threaded engagement into the implant via the axial bore of the transmucosal collar to secure the transmucosal collar to the implant at a position situating an upper end of the fixation screw adjacent an upper end of the upper portion of the transmucosal collar;

a mounting head having a threaded blind-hole extending thereinto from a bottom end thereof and an upper portion located above the bottom end and presenting a contoured exterior, the threaded blind-hole being configured to thread onto the cylindrical upper portion of the transmucosal collar to position a closed end of the blind hole over the upper end of the upper portion of the transmucosal collar when threaded thereonto, the threaded blind-hole of the mounting head and the cylindrical upper portion of the transmucosal collar being threaded in a direction opposite the threaded shaft of the fixation screw; and an abutment member defining the longitudinal abutment axis and having a bottom end thereof configured to fit onto the upper portion of the mounting head in slidable engagement with the contoured exterior thereof to allow shifting of the abutment member relative to the mounting head to change a degree of alignment between the longitudinal abutment axis and the longitudinal implant axis.

In one embodiment, the mounting head has a largely rounded or hemispherical upper portion to provide a platform for free angulation of an abutment composed of castable plastic or milling wax. The mounting head is preferably composed of material capable of being cast or soldered to. In this configuration, the abutment mold is preferably composed of plastic or milling plastic may be freely angled along the hemispherical surface of the mounting head during case design, and then cast to the head at the selected position, creating free user-control over angulation. The mounting head may include grooves or other surface treatment to improve casting to the mounting head. The abutment may alternatively be pre-cast and affixed to the mounting head through soldering with the rounded surface still permitting free angulation of the abutment.

In another embodiment, the mounting head has a somewhat mushroomhead shape presenting a rounded circumferential surface that is designed to receive a castable plastic abutment. The base of this plastic abutment is designed to seat around this rounded surface with the connection acting in a manner like a ball and socket joint. An indented annular groove around the base of the rounded circumferential surface allow for free motion of the plastic abutment allowing the user to again freely configure the angulation of the case before casting the abutment to the mounting head.

According to another aspect of the invention there is provided a system for supporting dental implant mounting heads on dental implants with which said mounting heads are not directly compatible, the system comprising:

a plurality of transmucosal collars of different types, the transmucosal collars of each type each comprising a lower portion configured to coaxially engage an upper end of a respective one of different types of dental implant, a cylindrical upper portion having external threading thereon, and an axial bore passing fully through the transmucosal member from an upper end of the upper portion to a lower end of the lower portion;

a plurality of fixation screws of different types, the fixation screws of each type each comprising an externally threaded shaft with external threading configured to mate with internal threading of a respective one of internal thread types among the different types of dental implants via the axial bore of one of the transmucosal collars to secure said transmucosal collar to the implant at a position situating an upper end of the fixation screw adjacent an upper end of the upper portion of the transmucosal collar;

a plurality of mounting heads of different types, the different types being used to support dental prostheses of different types or support dental prostheses of a same type in a different manner, each mounting head having a threaded blind-hole extending thereinto from a bottom end thereof to define internal threading of the mounting head;

wherein the internal threading of the mounting heads and the external threading of the transmucosal collars are threaded in a direction opposite the external threading of each the fixation screws of the different types, and wherein the external threading of the cylindrical upper portions of the transmucosal collars of different types match one another and the internal threading of the mounting heads of the different types match one another so that each type of mounting head is configured for selective threading onto the cylindrical upper portion of the transmucosal collars of different types, said selective threading acting to position a closed end of the blind hole over the upper end of the upper portion of the transmucosal collar when threaded thereonto.

This aspect of the invention therefore provides a system for mounting a dental prosthetic structure on a dental implant, which system includes a transmucosal member for attachment to the dental implant via a fixation screw and having an attachment portion for receiving differently configured mounting heads designed for various dental applications, such as support of single or multiple tooth crown and bridge restorations, support for overdentures, overdenture bars or configured for use with precision attachments. All mounting heads of the system share a standardized attachment portion for attachment to the transmucosal collar, allowing them to share a common screw-retained mode of attachment to a variety of standard-threaded implant bodies.

The different mounting heads share internal threading opposite to that of the fixation screw attaching the transmucosal collar to the implant body to order to prevent rotation and loosening of the screw. As well, the top of the screw rests against the base of a mounting head when it is attached to the transmucosal collar holding the screw in place. The mounting head remains removable in all configurations maintaining ease of access to the fixation screw. The interior portion of the transmucosal collar may include a beveled rest for the head of the fixation screw to help direct stress forces parallel to the shaft of the fixation screw easing stresses that may occur from angling of the abutment.

The ability of a variety of mounting heads to share a standardized connection method to a screw retained transmucosal collar that may be modified to various implant bodies, allows abutment and prosthesis attachment configurations to retain the benefits of a non-cemented mode of connection that may not previously have been able to do so.

According to another aspect of the invention there is provided a dental implant mounting head for supporting an abutment or other attachment on a dental implant, the mounting head comprising a base composed of a first material suitable for casting-to and having a bottom end arranged to connection to a support feature at an upper end of the implant, and an upper portion comprising a different castable material carried on the base and presenting outer surfaces configured for receipt of the abutment or attachment thereon, whereby the abutment or attachment and the second portion of the mounting base are castable to the base to secure the abutment or attachment to the implant.

BRIEF DESCRIPTION OF THE DRAWINGS

In the accompanying drawings, which illustrate exemplary embodiments of the present invention:

FIG. 1A is an exploded elevational view of a first embodiment dental replacement mounting system in accordance with the present invention, they mounting system featuring a domed mounting head cooperating with a rounded hollow in the bottom of an abutment to allow angular adjustment of the abutment relative to the implant.

FIG. 1B is an assembled elevational view of the first embodiment mounting system from the same side thereof as FIG. 1A.

FIG. 1C is an assembled elevational view of the first embodiment mounting system from another side thereof, ninety degrees from the viewing plane of FIGS. 1 and 2.

DETAILED DESCRIPTION

Figure 2A:
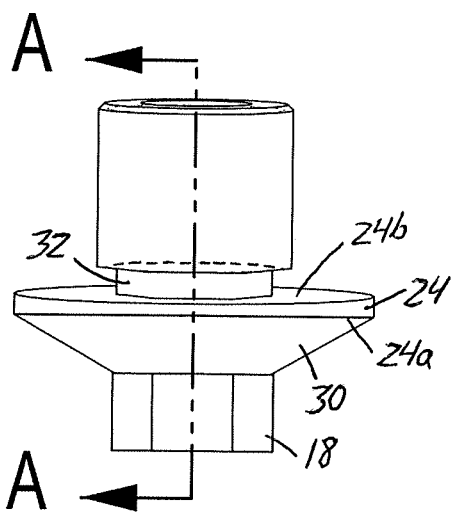
FIG. 2A is a side elevational view of a transmucosal collar similar to that shown in the first embodiment mounting system of FIG. 1.
Figure 2B:
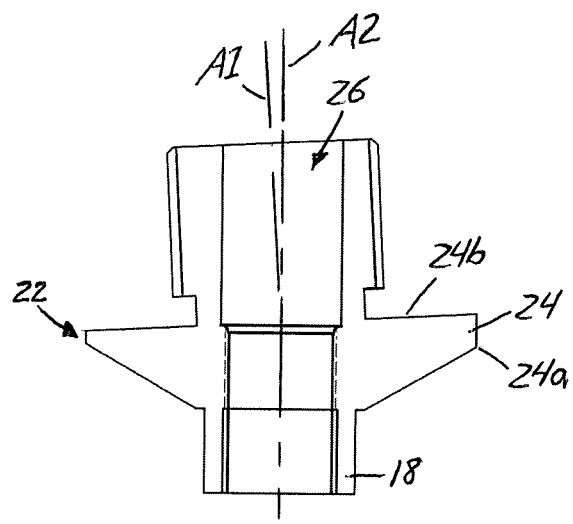
FIG. 2B is a cross-section al view of the transmucosal collar of FIG. 2A as taken along line A-A thereof.
Figure 2C:
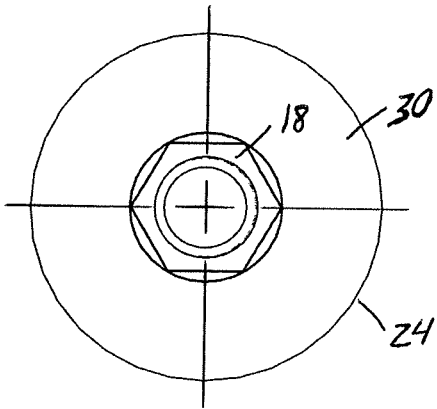
FIG. 2C is a bottom plan view of the transmucosal collar of FIG. 2A.
Figure 2D:
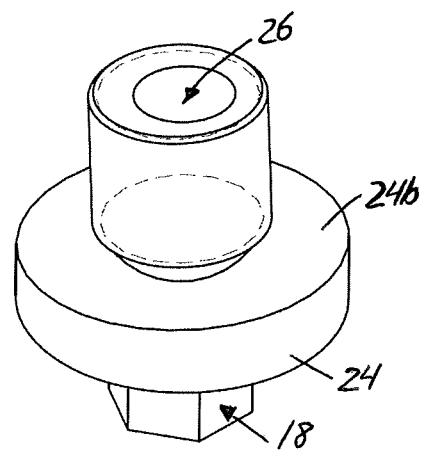
FIG. 2D is a perspective view of the transmucosal collar of FIG. 2A.

The dental replacement system 10 in accordance with a first embodiment the invention, as shown in FIG. 1, includes a transmucosal member or collar 12 to be fastened to an implant embedded into the jaw bone of a patient, a fixation screw 14 and a mounting base or head 16 for supporting an artificial tooth, bridge or denture at a selected orientation, which may differ from the longitudinal direction of the implant.

The transmucosal collar 12 and fixation screw 14 are of similar structure and function as those described in the above incorporated reference (U.S. Pat. No. 5,571,015). The collar 12, shown in isolation in FIG. 2, thus features a lower portion 18 having a hexagonal outer periphery sized to fit in a non-rotational manner within a hexagonal axial recess in the top end of a dental implant of the type described in the incorporated reference, an externally threaded cylindrical upper portion 20 of hollow circular cross section, and an intermediate portion 22 featuring an annular flange 24 whose planar bottom end 24a projects radially outward relative to the hexagonal lower portion 18 at a position between the upper and lower portions. A through bore 26 extends axially through the collar 12 from the top end of the upper portion 20 to the bottom end of the lower portion 18. In the illustrated collar 12, the longitudinal axis A1 of the upper portion 20 is offset from the longitudinal axis A2 of the lower portion 18, and thus from the axis of the throughbore 26 which is coincident therewith, by an acute oblique angle. The planar bottom and top faces 24a, 24b of the annular flange 24 are respectively perpendicular to the longitudinal axes of the lower and upper portions, and thus are non-parallel. The collar 12 thus incorporates the angled upper and lower portions of the collar of FIG. 5 of the incorporated reference, to provide angulation between the implant and the mounting head to be installed on the collar, with the hollow through-bored configuration of the collar of FIG. 2 of the incorporated reference, to cooperate with a fixation screw that engages the threaded bore of the implant body and is capped off by the mounting head to prevent or limit loosening of this threaded engagement. The collar differs from the hollow collar of the incorporated reference in the replacement of a right-angle shoulder in the internal bore of the collar at the transition between the externally threaded upper portion and the externally flanged intermediate portion with a beveled or tapered shoulder 28, in the presence of an outward frustoconical flaring 30 of the collar body from the lower portion 18 to the outer rim of the annular flange 24 of the intermediate portion, and in the presence of an area of reduced outer diameter 32 where the otherwise externally threaded upper portion 20 meets the annular flange 24 of the intermediate portion 22. The gradual radial transition provided by the frustoconical upward flaring of the flange from the smaller diameter lower portion is used to reduce stress on the implant body compared to the prior design of the incorporated reference, where the bottom of flange simply jutted directly from the smaller diameter of the lower portion at a right angle from the top of the implant body.

The fixation screw or bolt features an externally threaded lower shaft portion 34 at its bottom end for engagement with the internal threading of an implant body, an upper head portion 36 at its top end with a diametrically oriented slot extending thereinto for engagement by a suitable flat-headed driver, and an intermediate shaft portion 38 of reduced diameter joining the head and threaded lower shaft portions together. To assemble the collar 12 onto the implant body, the threaded lower shaft portion 34 of the screw 14 is passed through the axial bore 26 of the collar from the upper portion 20 thereof and onward through the remainder of the collar into the threaded internal bore of the implant body, which extends downward from the hexagonal recess at the top end thereof. Rotation of the screw in a thread advancing direction acts to thread the screw into engagement with the implant body. Sufficient tightening of the screw brings the shoulder 36a at the bottom end of the screw head into abutment against the tapered internal shoulder 28 of the collar 12, and clamps the collar 12 down on the implant body to hold the intermediate portion 22 thereof against the annular top end of the implant body closing around the nested hexagonal features of the implant and collar. It will be appreciate that while a linearly slotted screw is described and illustrated, other rotational drive configurations may be employed, including but not limited to a hex-head configuration where a tool head of hexagonal outer cross-section is inserted into a hexagonal recess in the head of the screw or bolt.

The first embodiment mounting head 16 of FIG. 1 features a cylindrical lower portion 40 of circular cross-section and a domed upper portion 42 supported thereatop. The dome presents a frustospherical outward-facing surface, which may be hemispherical or less-than hemispherical. The cylindrical outer periphery of the lower portion 40 closes concentrically around a longitudinal axis of the mounting head, and the apex or peak of the domed upper portion lies on this axis. FIG. 4 shows a slight variant of the FIG. 1 mounting head, where an externally frusto-conical intermediate portion 43 is found between the cylindrical lower portion and the dome-shaped upper portion, and integrally joins the same by tapering from a larger diameter at the top of the lower cylindrical portion to a smaller diameter at the bottom of the frustospherical dome portion. A threaded blind hole 44 extends into the mounting head 16 from the planar bottom 40a of the lower portion 40, concentric with the aforementioned longitudinal axis A3 of the mounting head. These internal threads of the mounting head are configured to mate with the external threads on the cylindrical upper portion 20 of the transmucosal collar 12. The axial length of the threaded blind hole is equal or slightly greater than the axial length by which the cylindrical upper portion 20 of the collar 12 projects from the upper face 24b of the collar's annular flange 24, so that full threading of the mounting head 16 onto the upper portion of the collar 12 seats the planar bottom 40a of the mounting head on the planar upper face 24b of the collar's flange 24, and positions the closed end 44a of the mounting head's blind hole 44 directly on or closely over the annular top face of the collar's hollow cylindrical upper portion 20. The axial length of the head 36 of the fixation screw 14 is equal or nearly equal to the axial length of the collar's through-bore 26 from the beveled shoulder 28 to the top end of the cylindrical upper portion 20 of the collar 12 so that the slotted top face of the screw lies generally at the open top end of the through-bore. This way, the closed end 44a of the blind hole 44 of the mounting head 16 overlies the screw head in close proximity to, or contact with, the screw head 36. The direction of the mating threads of the mounting head and the transmucosal collar 12 is opposite the direction of the mating threads of the fixation screw and the implant body, and so this close positioning of the mounting head over the fixation screw prevents the screw from backing out of its tight threaded engagement with the implant body. Accordingly, a tight, stable joint is maintained between the implant body and the prosthetic finally installed on the mounting head.

A rectangular channel or groove 46 cuts across the domed upper portion 42 of the mounting head 16 in a radial direction relative to the longitudinal axis A3 thereof. The depth of the channel 46 extends into the dome 42 from thereabove, and the lengthwise dimension of the elongated channel extends outward from the axis A3 in opposing radial directions so that the bottom of the channel extends a full diameter of the frustospherical upper dome portion 42 in a radial plane of the longitudinal axis A3 at an intermediate location between the bottom of the dome and the apex thereof. The depth of the channel thus varies over linear lengthwise direction, from a maximum at apex of the dome at the central longitudinal axis A3, reducing symmetrically across the axis A3 to the opposing outer ends of the channel 46.

Figure 3A:
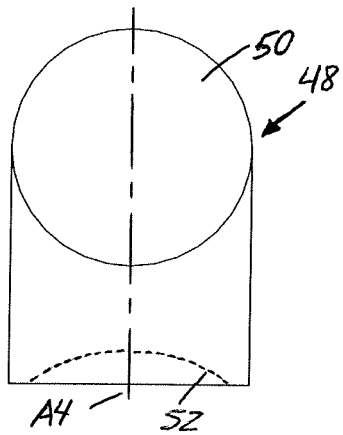
FIG. 3A is an elevational view of an abutment similar to that shown in the first embodiment mounting system, from the same viewing plane as FIG. 1C.
Figure 3B:
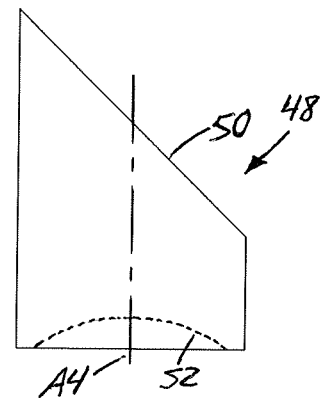
FIG. 3B is an elevational view of the abutment of FIG. 3A, from the same viewing plane as FIGS. 1A and 1B.
Figure 4B:
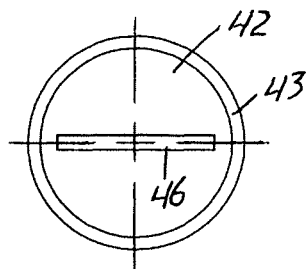
FIG. 4B is an overhead plan view of the mounting head of FIG. 4A.
Figure 4A:
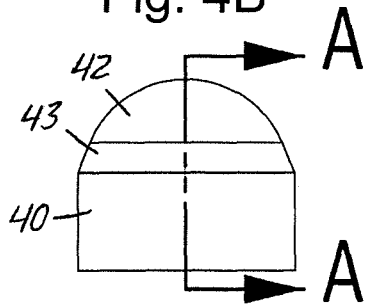
FIG. 4A is a side elevational view of a mounting head similar to that of FIG. 1.
Figure 4D:
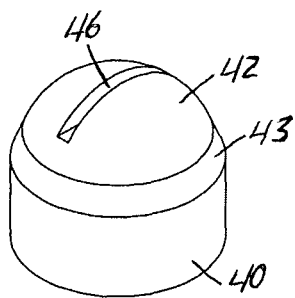
FIG. 4D is a perspective view of the mounting head of FIG. 4A.
Figure 4C:
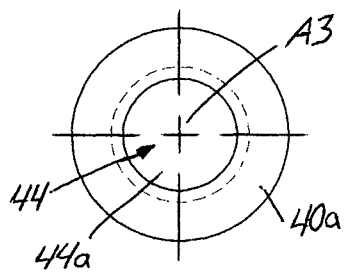
FIG. 4C is a bottom plan view of the mounting head of FIG. 4A.
Figure 4E:
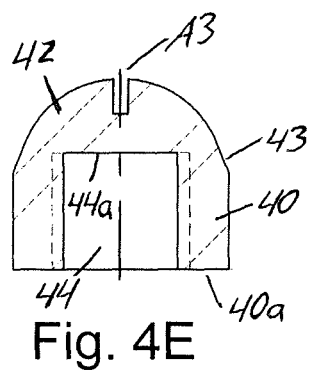
FIG. 4E is a cross-sectional view of the mounting head of FIG. 4A as taken along line A-A thereof.

The first embodiment mounting head not only functions as a cap for the internal bore of transmucosal collar, and thus also for the internal bore of the implant therebeneath, but also provides a base to which a dental abutment 48 or an abutment mount can be affixed along the rounded dome surface 42 in a selected orientation relative to the longitudinal axis A3 of the mounting head, thus allowing a user to set the abutment angle to a desired orientation irrespective of the longitudinal direction of the implant. Shown in more detail in FIG. 3, the abutment 48 of FIG. 1 has an exterior shape in the form of a round cylinder that has been obliquely truncated at its upper end and frustospherically recessed at its bottom end. The abutment 48 thus has an elliptical face 50 facing obliquely upward away from its longitudinal axis A4 and a concave frusto-spherical bottom 52 that peaks at the longitudinal axis A4. The radius of curvature of the concave bottom 52 matches that of the domed upper portion 42 of the mounting head 16 so that the abutment will conformingly sit atop the domed mounting head 16 and be slidable thereover in any direction out of a centrally aligned position in which the abutment axis A4 and the mounting head axis A3 align (i.e. coincide) with one another. It will be appreciated that abutments having shapes other than that of the illustrated truncated cylinder may likewise employ a concave underside for sliding interface with a domed mounting head to allow adjustment in position and angular orientation of the abutment.

Thus, the mounting head or base 16 permits alignment of a dental prosthetic structure affixed thereto by the abutment with adjacent teeth or abutments irrespective of the orientation of the implant. In the preferred embodiments, the abutment is made of a castable material, such as castable plastic or milling wax, and the mounting head 16 made of a material suitable for casting or soldering to. Accordingly, in incorporating a rounded or domed surface on the mounting head, one may set an abutment composed of plastic or millable wax in a freely angled manner in preparing the case, and then retain the abutment in the desired position and orientation of the mounting head in preparation for casting, for example using wax or resin to secure the abutment to the mounting head at the selected position and angle. Once set up in this manner, the user may cast the abutment to the mounting head in a chosen dental alloy at the chosen angle. An abutment composed of plastic or milling wax may also present the alternate option of being pre-cast and then soldered to the surface of the mounting head instead. The groove in the top of the rounded surface of the domed mounting head permits an improved structure for casting material or solder to flow into, strengthening the resulting connection between the abutment and the mounting head. Other surface treatments of the mounting head may also be used, including additional or alternative grooves milled into the surface of the mounting head, similar to the top groove or notch described above but at different locations or orientations to likewise accommodate metal or solder for casting or soldering respectively, or use of other industrial treatments that will increase the surface porosity of the metal mounting head.

As examples of suitable materials, the fixation screw and transmucosal collar are preferably made of medical grade titanium, although other options may be possible, for example surgical steel. The abutment sprue may be made from milling wax or a castable plastic such as polyoxymethylene, for example as available under the trade name Delrin™, or the like. The mounting head, when intended for having the abutment cast thereto, is preferably made from a high noble dental alloy, such as, but not limited to, 6019 alloy, although other materials may provide appropriate characteristics for casting to. For example, technology and techniques for casting to titanium or titanium alloys are being explored in the industry. Possible mounting head materials may include precious and non-precious materials, including gold, palladium, titanium, nickel-chrome, cobalt-chrome. For mounting heads to which an abutment is to be soldered after being cast on its own, the same materials may be employed (titanium, titanium alloys, high noble dental alloys like 6019), with additional options including gold-palladium alloys. An example of a suitable solder is high heat palladium solder. For the casting process, a "Type IV" high noble dental alloy is preferred, although semi-precious dental alloys may be use, for example at the user's discretion.

Figure 5:
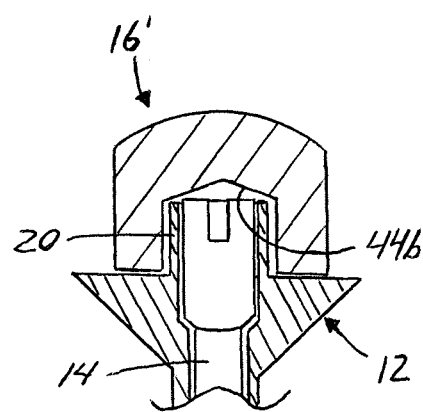
FIG. 5 is a cross-sectional view of a second embodiment mounting head, in which a blind hole for threading the mounting head onto the transmucosal collar has a divot at its closed end to allow minor flexing or movement of a fixation screw engaged to the implant through the transmucosal collar.

FIG. 5 schematically illustrates a second embodiment mounting head 16' similarly having a dome shaped upper portion, but differing in that the closed end 44b of the blind hole 44 in the bottom of the mounting head has a peaked or divoted configuration where the outer regions of the closed end 44b fit closely over, or in contact with, the upper end of the transmucosal collar's externally threaded cylindrical upper portion, while the greater axial length of the blind hole at the central region of its closed end leaves some room or space between the head 36 of the fixation screw 14 and the closed end of the hole. This allows for some minor flexing of movement of the fixation screw, while the close proximity of the hole's closed end over the screw head still prevents significant backing off of the fixation screw that would be sufficient to result in notable loosening of the connection to the implant. It will be appreciated that providing this limited spacing between the screw head and the portion of the mounting head positioned thereover may be created regardless of whether the closed end of the blind hole has the pointed, tent-shaped, conical or divoted shape mentioned above. For example, a flat-ended blind hole could likewise leave space between the screw head and top end of the collar as a result of making the hole slightly deeper than the height to which the upper portion of the transmucosal collar projects from the collar's flange. Threading of the mounting head onto the collar would be limited by eventual abutment of underside of the mounting head against the upper face of the collar flange, which would then leave the inner closed end of the blind hole unoccupied by the upper portion of the collar. However, a blind hole with a pointed end may be easier or more cost effective to manufacturer.

The first two embodiments thus each provide a mounting base or head made of cast- to or solder-to dental material designed for improved design of angulation-focused cases by featuring hemispherical or otherwise frustospherical top to allow for free motion of correspondingly shaped castable abutments composed of plastic or milling wax which may be shaped or angled as desired prior to casting, thereby further increasing control over angulation. The plastic or wax abutment may also be pre-cast separately and soldered to the base. Grooves and surface treatments may be utilized to improve casting. The rounded surface, in addition to easing angulation concerns, allows for utilization of a wider variety of abutments. The flat surface at the top of a mounting head shaped like a cylinder or truncated cone is obviously limited in the maximum diameter of the abutment placed upon it. A rounded surface, however, allows for the support of a much wider variety of abutment widths as the diameter rests along the greater surface of a totally rounded mounting head. That is, in placing an abutment on the flat upper surface of a flat mounting head, the abutment is limited in diameter to that surface, unless it is designed to envelop the mounting head. In which case, without appropriate shaping to provide a 'ball and socket' like connection, the ability to angle the abutment is hindered. With a rounded head like in the present invention, increasing the diameter of the abutment, and using the present invention's slight concave depression along the bottom, a larger diameter abutment can be used as it surrounds the rounded surface while still allowing smooth sliding interface for angling of the abutment.

The rounded surface of the mounting head adds an additional variable to a dental restoration. Once the abutment is affixed to the mounting head, thereby covering a partial area of the domed upper surface thereof, the exposed remainder of the domed surface presents a curve emerging at the base of the abutment, creating a natural-looking 'curved shoulder' or gradual transition between the abutment and the mounting head. The curve of this surface allows for a more natural emergence profile for aesthetic tooth design than a flat or non-existent shoulder, therefore allowing for more options in matching the anatomy of the patient's natural teeth.

Figure 6B:
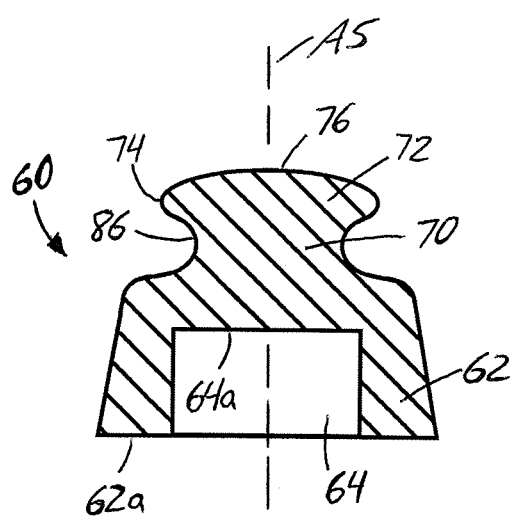
FIG. 6B is a cross-sectional view of the third embodiment mounting head in isolation.

Turning now to FIG. 6, a third embodiment dental replacement mounting system differs from the first embodiment of FIG. 1 by employing a different configuration for angular adjustment between the mounting head and the abutment. This configuration somewhat resembles a ball and socket joint formed between the mounting head and the plastic abutment allowing the abutment to sit upon the mounting base and be angled as the case is being designed. The user may then cast the abutment in a chosen dental alloy at the angle selected.

In more detail, the mounting head 60 of the third embodiment features a lower portion 62 that, like the first embodiment, features a planar bottom 62a, a circular cross-section whose center defines a longitudinal axis A5 of the mounting head 60, and a threaded blind-hole 64 extending upwardly into the mounting head from the bottom 62a at a central location concentric with the longitudinal axis A5. Again, the blind hole and its threading are configured to thread the mounting head onto the upper cylindrical portion of a transmucosal collar 12 in a position seating the bottom 62a of the mounting head on the collar's annular flange 24 and placing the closed end 64a of the blind hole 64 closely over the head of the fixation screw 14 securing the collar 12 to the internally threaded implant body 66. The resulting assembly is shown in FIG. 6A.

The third embodiment mounting head differs most notably from the first and second embodiment mounting heads in the replacement of a dome-shaped frustospherical upper portion with a somewhat mushroom shaped upper portion 68. This upper portion 68 features a central stem or base 70 of circular cross-section of smaller outer diameter than the top end 62b of the lower portion 62, from which it projects integrally upward in concentric alignment with the longitudinal axis A5 defined by the lower portion. Atop the stem is an integrally defined head 72, also of concentric circular cross-section in planes normal to the longitudinal axis A5, that projects outwardly to a greater radial extent than the stem beneath it. The round outer rim or circumference 74 of the head 72 is convexly curved in each axial plane extending radially from the longitudinal axis A5, but the top surface 76 of the head 72 does not share a common uniform radius of curvature with the outer rim, instead having a relatively flat or greater-radius curvature than the convex rim in its connection of diametrically opposing points thereof. The convex curve of the rim bulges outwardly from the base 70 below it, giving the head portion 72 its mushroom-head shape.

Figure 6C:
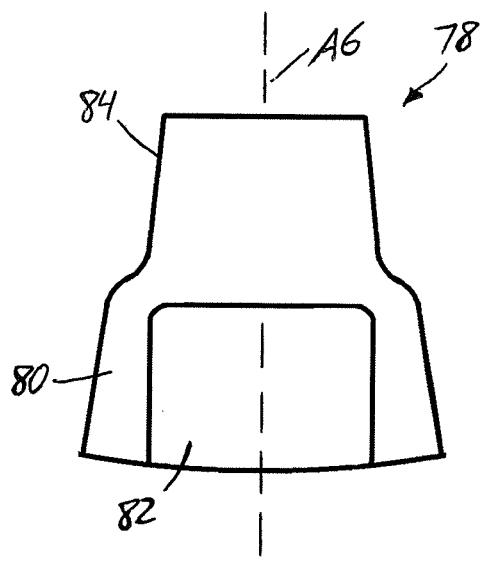
FIG. 6C is a cross-sectional view of the third embodiment abutment in isolation.
Figure 6A:
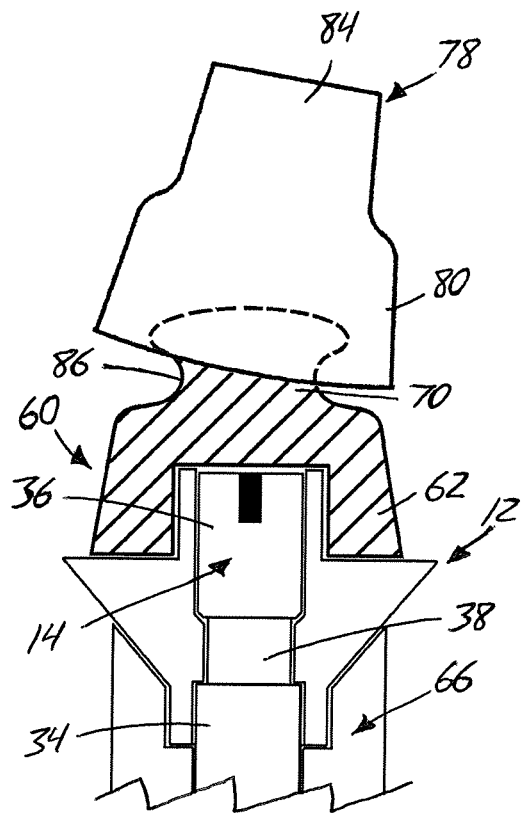
FIG. 6A is a cross-sectional view of a mounting system like that of FIG. 1, but featuring a third embodiment mounting head and abutment utilizing a mushroom-head shaped tip of the mounting head over which a hollowed bottom socket of the abutment fits in a manner allowing tilting of the abutment out of concentric alignment with the mounting head in any direction.

With reference to FIG. 6C, the third embodiment abutment 78 features a lower portion 80 of hollow circular cross-section forming a socket or recess 82 extending upwardly into the abutment 78 from a bottom end thereof in concentric alignment with the longitudinal axis A6 defined at the center of the lower portion's circular cross-section. A solid upper portion 84 of the abutment is integrally positioned over a closed upper end of the socket 82, and in the illustrated embodiment is in the form of a round cylinder that projects concentrically upward from the lower portion 80 and has a smaller outer diameter than the top end of the larger lower portion, although other shapes, orientations and relative sizing may alternatively be used. The round socket 82 is sized to fit around the rim of the mushroom-headed upper extent of the mounting head, where the cylindrical wall of the socket 82 can slide up and down on the convex outer rim 74 of the mounting head 60 at opposing positions around the diameter of the socket to tilt the axis A6 of the abutment relative to the longitudinal axis A5 of the mounting head. The outward bulge of the convex rim of the mounting head's upper portion around the smaller-diameter base thereof creates an annular groove 86 indented beneath this outward bulging shape to accommodate one of two diametrically opposite points around the bottom end of the abutment when the opposing point is raised upward along the mounting rim at an opposite location therearound during tilting of the abutment. The tiltability of the abutment allows a user to set the abutment in a desired orientation relative to the mounting head.

The third embodiment thus provides a mounting head or base made of appropriate cast-to material designed to fit a corresponding castable abutment, seated in a ball-and-socket-like manner giving a second option for angled case design. This mounting base is designed to be castable-to once the angle of the abutment has been set as desired. Alternatively, like the first two embodiments, the mounting head may be produced of a suitable material for soldering to, in which case the abutment may be pre-cast and subsequently soldered to the mounting head. However, while the mounting head and abutment of the first two embodiments have matching frustospherical surfaces that conform to one another over the full area of the concave hollow in the underside of the abutment to create a solderable interface around the full circumference of the abutment, the fit between the mounting head and abutment of the third embodiment may be less conducive to soldering due to limited areas of close contact between the two pieces. Therefore, casting may be the preferred method of connection for the third embodiment. The exemplary materials listed above for the abutment and mounting head of the first two embodiments may likewise be employed for the corresponding components of the third embodiment.

Other than the difference in the arrangement for allowing tilt of the abutment axis into and out of alignment with the mounting head axis in any direction therearound, the third embodiment dental replacement system is used in generally the same manner as the first embodiment of FIG. 1, as follows.

A hexheaded or slotted fixation bolt 14 extends through a central bore of the transmucosal collar 12, which preferably has beveled Internet rests, and is screwed into the implant and holds the transmucosal collar in place. Like for the first embodiment, this beveled recessed area at the upward transition to the upper most part of the inner bore/channel of the transmucosal collar acts to improve stress conditions on more extremely-angled cases that may now be possible with the above described mounting head configurations. The transmucosal collar has an annular flange which rests flush against the top end of the implant when the collar is affixed thereto. The annular flange divides the transmucosal collar into a cylindrical, upper attachment portion which extends through the gingival tissue and to which the mounting base is affixed, and a lower portion which extends into a socket of complementary shape in the implant top end. This locks the transmucosal collar in the implant against rotation.

The inner surface of the mounting head is provided with a left hand inner thread complementary to a left hand outer thread on the outer surface of the attachment portion of the transmucosal collar. Rotation of the mounting base in relation to the transmucosal collar during use of the mounting system is prevented by conventional means well known in the art such as a horizontal worm screw (not illustrated) or one of the adhesives commonly used to prevent screw loosening, for example Omni Lock™ or a medical silicon adhesive. All proposed mounting bases are releasably affixed to be operator removable.

The height of the interior side wall of the mounting base is equal to, or only slightly greater than, the height of the attachment portion of the transmucosal collar so that a lower end of the side wall engages the flange when the mounting base is fully installed on the transmucosal collar.

A loosening of the fixation bolt during or after installation of the mounting base is prevented, since the complimentarily shaped portion of the transmucosal collar is locked in the implant and the end wall of the base, once installed, rests against or in close proximity to the head of the fixation bolt, which together with the opposite direction of the respective threads on the base and the bolt makes rotation of the bolt impossible without removal of the base.

The above embodiments can employ transmucosal collars of angled configuration (i.e. intentionally misaligned upper and lower portions providing a degree of misalignment of the upper portion relative to the implant), or non-angled configuration (i.e. aligned coaxial upper and lower portions positioning the upper portion concentric with the implant body). In the first configuration, the dental implant system provides two points of angular adjustment, a first degree of angular adjustment at the transmucosal collar, and a second degree of angular adjustment at the sliding interface that allows tilting between the mounting head and the abutment. In situations where the adjustability of the abutment on the mounting head is sufficient on its own to fully compensate for implant angulation and set the abutment axis to a desired orientation relative to the implant axis, a non-angled transmucosal collar may instead be used.

The use in the above embodiments of a mounting head/collar combination for angling the abutment, as opposed to utilizing the screw itself as a part of the angulation solution, such as proposed in aforementioned U.S. Pat. No. 6,786,725, contributes to stability and strength of the resulting structure. Positioning the screw, which holds the abutment to the implant body in the end structure, at an angle other than parallel to the longitudinal axis of the implant body creates sub-optimal stress conditions, increasing the likelihood of screw breakage. Further, some of the prior art angulation solutions resembling ball and socket joints where the 'ball' is an integral part of the fixation screw threaded into the implant body (e.g. U.S. Pat. Nos. 6,786,725; 3,732,621; 4,793,808; 5,662,475) may experience increased cantilever forces on the screw as a result of its installed position resting its upper end relatively 'high' in relation to the implant body which holds it. The present invention allows the top of the screw to rest 'low' in the collar bore/channel that leads into the implant body, and in an orientation parallel to the implant's longitudinal axis for a stable mode of connection.

Having the screw parallel to the implant increases the axial distance over which the threaded connection between the two can exist.

In addition to the use of the above embodiments to compensate for implant angulation, the present invention extends to use of dental implant systems employing various combinations of differently configured mounting heads, transmucosal collars and fixation screws to enable use of a wide variety of different style mounting heads on different commercially available implant bodies for which such mounting heads were unavailable or incompatible. Examples of different mounting head types include those detailed above for angular adjustability of abutments, o-ring denture attachments, magnetic denture attachments, mounting heads capable of supporting overdenture bars, and mounting heads configured to carry abutments for supporting intracoronal attachments.

That is, fixation screws and transmucosal collars can be manufactured in different types for compatibility with different types of implant bodies, while retaining the same mounting head connection features (i.e. same external threading on a same-size upper portion of each transmucosal collar) among all the different types so that a line of mounting heads all featuring the same size blind-hole and same internal threading can all be mounted on any of the implant-tailored transmucosal collars. As some commercially available implant bodies employ the same thread standard, it may not be necessary to produce a dedicated implant-specific fixation screw for each type of implant to be covered by the system. The different transmucosal collar types would be configured with lower portions suitably shaped and dimensioned for insertion into the open upper end of the different implant types, while the size and threading of the upper portion of the transmucosal collars would remain consistent from type to type, whereby any mounting head could be threaded onto any collar. As all or most commercially available implant bodies employ right-hand internal threading, all the collars and mounting heads could employ left hand threading, thereby universally preventing backing off of the fixation screw from any of the different types of implants covered by the system due to the use of opposing thread directions to prevent unwanted rotation of the fixation screw in a loosening direction.

With such a system in place, a practitioner experienced and comfortable in use of a particular type or brand of implant would be able to consistently use that implant where suitable regardless of whether a directly compliant mounting head of the required type is available, as the practitioner would simply order a transmucosal collar of the type configured for that implant, along with the required mounting head.

The invention thus employs a variety of mounting base types which share common anti-rotational features allowing attachment to a screw-retained transmucosal collar thereby, helping standardize inventories and techniques. Orientation of abutment design normally not suited to screw retention may now be used on screw retained implant bodies. That is, one flaw of many prior art screw retained designs is that the screw is fed into the implant through the abutment, unlike the present invention where the screw is located under the mounting head on which the abutment is placed. In the prior art, because the screw goes through an abutment that is limited in its angular positioning, that sometimes results in screws needing to be attached straight through the front of a restored tooth, thereby marring the aesthetic design of the case (prominent and visible screw hole on the surface of the tooth). In other prior art designs, cement is used to affix everything, which is problematic for the hygienic reasons set out elsewhere herein. Screw retention is the most hygienic and convenient method of attachment, though previous designs in the field are flawed by the need to put the screw through the abutment. So where a prior art mechanism for compensating for implant angulation may have previously relied on bacteria prone cementing or unsightly screw engagement, it could now be modified to thread onto a transmucosal collar of the present invention to provide the security, sterility and visual appeal of a concealed fixation screw.

In addition, common mounting bases may be affixed to different implant bodies simply by substituting an appropriate transmucosal collar. Anti-loosening and anti-rotational features are also shared among mounting base configurations through opposing threading between the base and the transmucosal collar and a base resting to act as a cap on the fixation screw. The present invention thus provides a dental abutment platform composed of a number of user-selectable screw-affixed transmucosal collars intended to support any of a number mounting bases designed for various dental implant specific applications, such as control over angulation of the abutment while retaining features that prevent loosening of fixation screws and permit ease of component removal for repair and maintenance of the implant. In the case of a denture, the denture rests on the abutments (or o-ring, etc.) and is retained magnetically or with a denture adhesive. For a crown, the porcelain is generally attached to a metal 'coping'. This coping fits over the abutment and can be retained by cement, or more preferably with a medical silicon adhesive (recommended). Medical silicon is sterile and has strong anti-bacterial properties maintaining the overall principal of high-hygiene restorations. By employing standard techniques to remove the prosthetic, further removal of components of the system are simple. The silicon gel bond between the mounting head and the collar is removed using known techniques, whereafter the mounting head is simply unscrewed from the collar, thereby giving access to the fixation screw that attaches the collar to the implant.

Because the mounting head or base is composed of a cast-to dental alloy and is affixed to a transmucosal collar, which is preferably composed of medical grade titanium, and both components may be varied in dimension (in particular with regards to their installed heights, as dictated by their axial lengths), production of collars of different heights for each implant type and production of mounting heads of the same type but different heights allows greater variability in case design. When the abutment is cast to the mounting head, the two pieces form a singular piece with continuous surfaces, and so through selection from mounting heads of different axial lengths and shapes, the resulting piece can be varied for both height and orientation for the support of restorations utilizing dental porcelains. With a titanium collar providing a second variable of height that is not designed for compatibility with dental porcelains, the user has increased control over case design, being able to deal with varying dimensions of gum thickness and tooth length by selecting a collar of suitable axial length according to the patient's gum thickness and selecting a mounting head of suitable height according to a suitable prosthetic tooth length for the patient.

For the transmucosal collar, the axial length of the intermediate portion, which may coincide with the thickness of the flange (whether or not it has the preferred frustoconical underside and whether or not its upper surface is angled, i.e. non-perpendicular to the longitudinal axis of the collar's lower portion) may be varied from one collar to another, resulting in the collars of varying height for the same implant type. While the flange contributes to the stability of the design by resisting tilting of the upper portion of the collar relative to the engaged lower portion and implant through its contact with the top end of the implant, it may be possible to have non-angled collars without the flange, where the bottom of the mounting head is instead seated directly atop the implant body itself.

The flange thus serves three purposes. 1) lending stability to the design; 2) its thickness can be varied to provide vertical height in a material (e.g. medical titanium) not intended to have porcelain attached to it, i.e. providing height in the gum region; and 3) in many cases the flange can provide a surface for the dental restoration (e.g. a crown) to rest upon (without direct attachment) if the combination of the flange width/diameter and mounting head width/diameter permits, i.e. if an outer region of the flange's upper surface is left unconcealed by the mounting head, and thus available to accommodate seating of the restoration. By resting on the flange when the dental restoration is in place, it adds an extra level of anti-rotational capacity (e.g. the prosthetic tooth affixed to the mounting base/abutment will have friction against the transmucosal collar upon which it rests). Accordingly, a flanged collar is preferred, but a transmucosal collar could be created with a minimal or even non-existent flange while providing functional results in some cases.

The use in the above embodiments of cast-to or soldered connections of the abutments to the mounting heads, as opposed to utilizing an exterior screw or cement to affix the abutment or to secure it in place, is in order to create a surface which creates an effective barrier to the spread of bacteria. Cement and accessible screws have been shown to create favourable conditions for oral bacteria, which can lead to unpleasant odors or infection in the patient. The mounting head of the foregoing dental replacement systems, in addition to acting as a restraining cap on the interior screw bore/channel leading into the implant body through the transmucosal collar, is preferably used with a medical silicon gel or medical silicon adhesive gel in order to act as an effective anti-bacterial wall or barrier. With this method, with the abutment soldered or cast to the mounting head, the mounting head closing the channel to the interior of the implant body and the point of connection between the mounting head and the transmucosal collar is sealed with medical silicon gel (which adds an additional anti-rotational-factor to the structure, by resisting rotation of the mounting head relative to the transmucosal collar), by which the system provides an effective barrier against oral bacterial build up. The gel may be applied around the exterior perimeter of the mounting head after it is fully threaded onto the collar, or may be precoated onto one or both pieces prior to their attachment, so long as the applied gel doesn't interfere with the threaded engagement of the two pieces or a full proper seating of the mounting head on the collar flange. A small amount might be applied to the threads as a further anti-rotational element, but this would be generally considered unnecessary. Generally, the silicon can be applied to the surface where any two components meet after they are properly seated, for example not only at the interfacing surfaces of the mounting head and the collar, but also at the contact of the underside of the collar flange with the implant body.

Figure 7A:
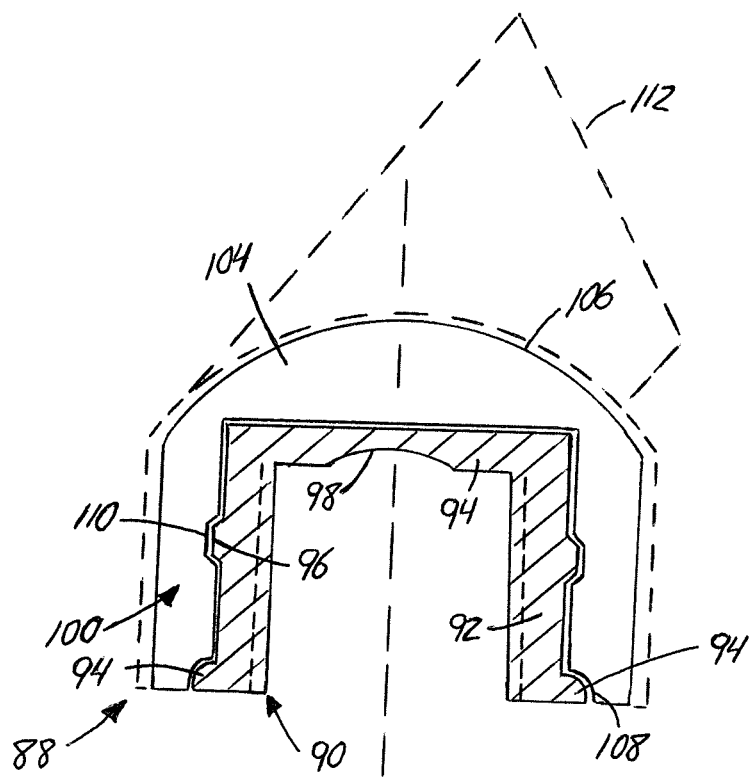
FIG. 7A is a cross-sectional view of a fourth embodiment mounting head having a two material composition with an inner piece of cast-to material adapted for attachment to a transmucosal collar and an outer piece of castable material for supporting an abutment, an example of which is shown in phantom.
Figure 7B:
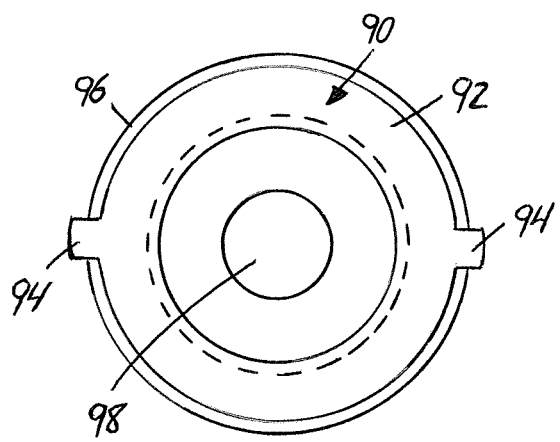
FIG. 7B is a bottom plan view of the fourth embodiment mounting head.

FIG. 7 features a mounting head 88, shown in solid lines, according to a fourth embodiment of the present invention. Unlike the mounting heads of the other illustrated embodiments, each of which is formed a single unitary body of one material that integrally defines the differently shaped portions of the overall mounting head structure, the fourth embodiment mounting head 88 has a two-material, two-piece structure.

An inner piece 90 of the mounting head 88 has a hollow generally cylindrical shape featuring a cylindrical wall 92 closing around a longitudinal axis A7 and circular top wall 94 integrally spanning over the upper end of the cylindrical wall 92. At an open bottom end of the cylindrical wall 92 opposite the top wall 94, a diametrically opposed pair of stubs 94 jut radially outward a short distance from the exterior surface of the cylindrical wall 92. At an intermediate location between the stub-equipped bottom end of the inner piece 90 and the top wall 94 thereof, an outer lip 96 also extends radially a short distance radially outward from the outer surface of the cylindrical wall 92, but has an annular shape spanning fully around the entire cylindrical wall. The cylindrical wall 92 of the inner piece 90 is internally threaded, so that the piece defines a threaded blind hole extending upward into it from its flat bottom end like the mounting heads of other embodiments described above so that the inner piece can likewise be threaded onto the externally threaded upper cylindrical portion of a transmucosal collar to seat the flat bottom of the inner piece against the flat upper surface of the collar's flange.

As described above for the second embodiment mounting head, the upper wall 94 defining the closed end of the inner pieces central interior blind-hole may be indented or devoted, as shown by a concave central recess at 98, to provide extra room between the end of the threading and the resulting peak of the blind hole to accommodate some flexing or movement of the transmucosal collar's fixation screw, while the upper wall 94 will still act as a stop to prevent significant loosening of the screw. The inner piece is made of a material suitable for casting-to, such as those listed herein above for other embodiments, and is preferably a unitary member integrally defining the above described features, for example as machined from a piece of stock of such suitable material.

The mounting head 88 is completed by a cap-like outer piece 100 externally fitted over the inner piece 90. The outer piece is made of castable material such as castable plastic or milling wax, and in the illustrated embodiment has an exterior shape corresponding to the domed mounting head of the first embodiment of FIG. 1. Accordingly, the outer piece 100 has a lower hollow cylindrical portion in the form of a flat-bottomed cylindrical wall 102 closing concentrically about the central longitudinal axis A7 of the inner piece's cylindrical wall 92, and an externally domed upper portion 104 integrally closing over the top of the cylindrical wall 102 to present an upward and obliquely outward-facing frustospherically convex upper surface 106. The cylindrical wall 102 is open at its flat bottom end, thereby defining a blind-hole extending into the outer piece from the flat annular bottom end thereof to accommodate receipt of the inner piece 90. At the bottom end of the cylindrical wall 102, a pair of short radial slots 108 cut into the cylindrical wall of the outer piece at diametrically opposed positions at the inner surface thereof, each being sized to receive a respective one of the stubs 94 projecting from the exterior of the inner piece 90. At an axial distance upward from these slots, said distance matching the axial spacing of the stubs and lip of the inner piece, an annular slot or recess 110 juts into the cylindrical wall 102 of the outer piece from the inner surfaces thereof, the recess 110 having a radial extent and height/thickness sized to accommodate the lip 96 of the inner piece. In the illustrated embodiment, the underside of the outer piece's upper portion 104 and the topside of the inner piece's upper wall 94 are flat, but other shape suitable to fit over one another, preferably in a conforming manner, may alternatively be employed.

The inner surface of the outer piece's cylindrical wall 102 fits closely over the outer surface of the inner piece's cylindrical wall 92, with the annular recess and diametrically opposed radial slots of the outer piece respectively receiving the lip and stubs of the inner piece. The engagement of the circumferentially spaced apart stubs 94 of the inner piece 90 in respective slots 108 in the outer piece 100 prevents relative rotation between the two pieces about the longitudinal axis A7 of the mounting head, while the engagement of the inner piece's lip 96 into the annular recess 110 of the outer piece prevents, or at least resists, axial withdrawal of the outer piece from its installed position on and around the inner piece. With rotation between the two pieces blocked, the outer piece can be rotated by the user to thereby thread the inner piece onto the transimucosal collar.

The axial length of the boundary wall of the blind hole in the outer piece does not exceed the axial length of the outer surface of the inner piece's cylindrical wall, whereby the outer piece doesn't extend past the bottom of the inner piece, which would interfere with a preferred seating of the inner piece on the flange of the transmucosal collar. Preferably, the inner and outer pieces are coterminous and flat at their bottom ends for seating of the both pieces on the flange of the transmucosal collar.

The illustrated two piece mounting head 88, through its domed top surface 106, can be used with an abutment having a conformingly concave underside, such as the abutment of FIG. 1, or the abutment 112 shown in FIG. 7A in broken lines to illustrate how differently shaped abutments may be used, to allow angular adjustment of the abutment relative to the assembled mounting head, transmucosal collar and implant. The two-material design using castable material at the abutment receiving surface and cast-to material for the connection features for attachment to the transmucosal collar thus allows casting of the abutment and castable outer piece of the mounting head to the inner piece thereof after selection of the desired abutment angle.

Although the illustrated embodiment features a dome-shaped outer piece for angular abutment adjustment, other style mounting heads may similarly employ a two-material design using cast-to material for the collar attachment and castable material for the outer surfaces to which an abutment or other attachment is to be fixed. Likewise, mounting heads arranged for attachment to implant bodies in ways other than via a screw-retained transmucosal collar may likewise employ castable-to material for the implant attachment portion and a castable material for the portions to which an abutment or other attachment for supporting a dental abutment is to be secured. If the outside piece is of sufficient resilient flexibility, it may be produced separately from the inner piece and then installed thereover by way of a snap fit, where the cylindrical wall of the outer piece can flex sufficiently outwardly to be forced downwardly over the lip 96 of the inner piece until the lip reaches the annular recess of the outer piece, where the wall resiliently returns to its normal shape, thereby trapping the lip in the recess. The outer piece is rotated as required during this installation over the inner piece to angularly align the radial slots with the radially jutting stubs of the inner piece so that engagement of the lip into the recess acts to fully seat the outer piece downwardly over the stubs of the inner piece, whereby the two pieces are then rotatable together as a whole. It will be appreciated that that the number of stubs on the inner piece, and corresponding number of slots on the outer piece may be varied, for example increased in number or reduced to as little as one stub and one or more slots into which the one stub may be engaged. Preferably two or more stubs are used, which are preferably equally spaced around the longitudinal axis A7 of the mounting head.

In this two-piece assembly process, the same resiliency of the outer piece that allows its snap fit over the inner piece may likewise allow removal of the outer piece from the inner piece by a sufficient pulling force acting to disengaging the lip 96 from the recess 110, for example for substitution of a differently shaped or differently sized outer piece according to the needs of a particular case. For example, FIG. 7A uses broken lines at 114 to show how differently sized outer pieces may be used on the same inner piece. Accordingly, mounting heads may be sold preassembled, or sold as separate inner and outer pieces whereby the end user can select a suitable outer piece for the case in question, and accordingly install it on the inner piece. In the illustrated embodiment, the annular lip juts a shorter radial distance from the wall of the inner piece than the stubs in order to provide significant rotation-blocking surface contact while keeping down the amount of flex required to fit the outer piece over the inner piece. However, the relative sizing of the anti-rotation and anti-removal features may be varied.

Alternatively, it may be possible to manufacture the two-material mounting head configuration by first producing the inner piece, and then molding the outer piece directly onto the exterior of the inner piece.

While the illustrated embodiment features outward jutting features on the inner piece to engage the outer piece to act against attempted rotation or withdrawal, it may be possible to employ the reverse configuration where features jut inward from the outer piece to engage into receiving features on the exterior of the inner piece, or a combination of inward and outward jutting features engaged into receiving features on the two pieces.

The fourth embodiment thus provides mounting head 'core' manufactured with an inner portion shaped to accept the threaded portion of the transmucosal collar and an outer surface featuring a set outwardly directed flanges or projecting features, the whole core or inner piece being composed of a cast-to dental alloy. The inner portion threaded to fit the transmucosal collar shall be available in a set number of dimensions so as to be as near to universal as possible in fitting on transmucosal collars of varying shapes and sizes. Overtop this dental alloy core is fitted a pre-manufactured castable mold composed of a casting compatible plastic or wax material, which may be any of a wide variety of shapes and dimensions. The flanges in the mounting head 'core' aid in fixing the plastic cap in place during case design. In this way, a single mounting cap interface integrating all the benefits mentioned above (screw retention, bacterial barrier etc.) with a universal attachment method to the transmucosal collar and allowing a wide variety of castable dimensions may be formed.

As a further alternative to the first and second embodiments, in which the mounting head is prefabricated entirely out of a single cast-to material, and the fourth embodiment, in which the mounting head has an inner core formed of cast-to material and an exterior dome-tipped outer body for later casting, another variant allowing the end user to cast the domed surface in a material of their choice may feature a mounting head formed entirely of castable plastic or similar material.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A dental implant abutment mounting system for supporting an abutment on a dental implant, the system comprising:
   a transmucosal collar comprising a lower portion configured to engage an upper end of the dental implant, a cylindrical upper portion having external threading thereon, and an axial bore passing fully through the transmucosal collar from an upper end of the upper portion to a lower end of the lower portion;
   a fixation screw comprising an externally threaded shaft for threaded engagement into the implant via the axial bore of the transmucosal collar to secure the transmucosal collar to the implant;
   a mounting head having a threaded blind-hole extending thereinto from a bottom end thereof and an upper portion located above the bottom end, the threaded blind-hole being configured to thread onto the cylindrical upper portion of the transmucosal collar to position a closed end of the blind hole over the upper end of the upper portion of the transmucosal collar when threaded thereonto; and
   an abutment member attachable to the upper portion of the mounting head;
   wherein the mounting head comprises a first piece made of a first material and a second piece made of a different second material; the first piece defines the threaded-blind hole for engagement to the transmucosal collar; the second piece defines the upper portion of the mounting head, including an uppermost surface of the mounting head that is occupied by said different second material and resides furthest from the bottom end of the mounting head in an orientation facing away therefrom; the second piece is rotationally locked to the first piece for rotation therewith as a singular unit during threaded engagement of the first piece with the cylindrical upper portion of the transmucosal collar]; and both the second piece of the mounting head and the abutment member are castable to the first piece of the mounting head.

2. The system of claim 1 comprising radially jutting features on the first or second pieces, each extending into a respective receiving feature on the other piece at a respective location around a rotational axis of the mounting head about which rotation is required to thread the mounting head onto the transmucosal collar, and thereby blocking relative rotation between the first and second pieces about said rotational axis.

3. The system of claim 1 wherein the first material is a high noble dental alloy.

4. The system of claim 1 wherein the first material is 6019 alloy.

5. The system of claim 1 wherein the first material comprises titanium.

6. The system of claim 1 wherein the first material is a titanium alloy.

7. The system of claim 1 wherein the second material is a wax or plastic material.

8. The system of claim 1 wherein the mounting head has a radius and the uppermost surface of the mounting head comprises a convexly domed exterior surface that (a) defines an uppermost apex of the mounting head, and (b) spans a majority of said radius.

9. A dental implant mounting head for supporting an abutment or other attachment on a dental implant, the mounting head comprising a first piece composed of a first material and having a bottom end with a threaded blind hole for threaded connection to an externally threaded support feature on a transmucosal collar mounted at an upper end of the implant, and a second piece comprising a different second material carried on the first piece and presenting outer surfaces configured for receipt of the abutment or attachment thereon, wherein both the abutment or attachment and the second piece of the mounting head are castable to the first piece to secure the abutment or attachment to the implant, the second piece is rotationally locked to the first piece for rotation therewith as a singular unit during threaded engagement with the externally threaded support feature of the transmucosal collar, and the outer surfaces presented by the different second material of said second piece include an uppermost surface of the mounting head that is occupied by said different second material and resides furthest from the bottom end of the mounting head in an orientation facing away therefrom.

10. The mounting head of claim 9 comprising radially jutting features on the first or second piece, each extending into a respective receiving feature on the other piece at a respective location around an axis of the mounting head about which rotation is required to assemble the mounting head to the dental implant via a threaded connection, and thereby blocking relative rotation between the first and second pieces about said axis.

11. The mounting head of claim 9 wherein the first material is a high noble dental alloy.

12. The mounting head of claim 9 wherein the first material is 6019 alloy.

13. The mounting head of claim 9 wherein the first material comprises titanium.

14. The mounting head of claim 9 wherein the first material is a titanium alloy.

15. The mounting head of claim 9 wherein the second material is a wax or plastic material.

16. The mounting head of claim 9 wherein the mounting head has a radius, and the uppermost surface occupied by the different second material comprises a convexly domed exterior surface that (a) defines an uppermost apex of the mounting head, and (b) spans a majority of said radius.

17. The mounting head of claim 16 wherein the mounting head has a radius and the convexly domed exterior supper surface is spherically contoured and spans the majority of said radius.

18. A dental implant abutment mounting system for supporting an abutment on a dental implant, the system comprising:
   a transmucosal collar comprising a lower portion configured to engage an upper end of the dental implant, a cylindrical upper portion having external threading thereon, and an axial bore passing fully through the transmucosal collar from an upper end of the upper portion to a lower end of the lower portion;
   a fixation screw comprising an externally threaded shaft for threaded engagement into the implant via the axial bore of the transmucosal collar to secure the transmucosal collar to the implant;
   a mounting head having a threaded blind-hole extending thereinto from a bottom end thereof and an upper portion located above the bottom end, the threaded blind-hole being configured to thread onto the cylindrical upper portion of the transmucosal collar to position a closed end of the blind hole over the upper end of the upper portion of the transmucosal collar when threaded thereonto; and an abutment member attachable to the upper portion of the mounting head;

wherein the mounting head comprises a first piece made of a first material and a second piece made of a different second material, the first piece defines the threaded-blind hole for engagement to the transmucosal collar, the second piece defines the upper portion of the mounting head, both the second material and the abutment member are castable to the first material, and a topside of the upper portion of the mounting head comprises a convexly domed uppermost surface that is formed of said second material and defines an uppermost apex of the mounting head situated furthest from, and facing away from, said bottom end of the mounting head.

19. The system of claim 18 wherein convexly domed upper surface is spherically contoured.

20. The system of claim 19 wherein the mounting head has a radius and the convexly domed upper surface spans the majority of said radius.

* * * * *